(12) United States Patent
Ikeda et al.

(10) Patent No.: US 7,145,500 B2
(45) Date of Patent: Dec. 5, 2006

(54) PULSE WAVE RADAR DEVICE

(75) Inventors: Hiroshi Ikeda, Tokyo (JP); Hideaki Shimoda, Tokyo (JP); Takeshi Yokoyama, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/213,884

(22) Filed: Aug. 30, 2005

(65) Prior Publication Data

US 2006/0044180 A1 Mar. 2, 2006

(30) Foreign Application Priority Data

Aug. 30, 2004 (JP) ............... 2004-250270

(51) Int. Cl.
*G01S 7/34* (2006.01)
*G01S 7/285* (2006.01)
*G01S 13/93* (2006.01)

(52) U.S. Cl. ................. 342/92; 342/70; 342/89; 342/91; 342/118; 342/134

(58) Field of Classification Search .............. 342/27, 342/28, 70–72, 82–103, 118, 134–144, 159–165, 342/173–175, 189–197, 205
See application file for complete search history.

(56) References Cited

U.S. PATENT DOCUMENTS

| | | | | |
|---|---|---|---|---|
| 2,427,523 | A | * | 9/1947 | Dolberg et al. ............. 342/205 |
| 2,602,922 | A | | 7/1952 | Maynard et al. |
| 2,725,557 | A | * | 11/1955 | Hellings ..................... 342/205 |
| 3,305,859 | A | | 2/1967 | Schwartz |
| 3,683,324 | A | * | 8/1972 | Hoxsie ........................ 342/205 |
| 3,725,913 | A | | 4/1973 | Roehl et al. |
| 3,765,020 | A | | 10/1973 | Seager et al. |
| 4,169,263 | A | | 9/1979 | Hooker, Jr. et al. |
| 4,728,953 | A | * | 3/1988 | Richmond ................... 342/91 |
| 5,293,325 | A | * | 3/1994 | Roos ........................... 342/205 |
| 5,311,184 | A | * | 5/1994 | Kuntman .................... 342/205 |
| 2005/0134498 | A1 | | 6/2005 | Honya et al. |
| 2005/0134502 | A1 | | 6/2005 | Ikeda |
| 2005/0140542 | A1 | | 6/2005 | Ikeda |

FOREIGN PATENT DOCUMENTS

| | | |
|---|---|---|
| DE | 24 35 006 A1 | 2/1976 |
| GB | 1 226 900 | 3/1971 |
| JP | 58-180969 A | 10/1983 |
| JP | 60-190882 A | 9/1985 |
| JP | 6-174826 | 6/1994 |
| JP | 06-174826 A | 6/1994 |
| JP | 07-244154 A | 9/1995 |

OTHER PUBLICATIONS

U.S. Appl. No. 11/010,342, filed Dec. 14, 2004, Ikeda.
U.S. Appl. No. 11/016,973, filed Dec. 21, 2004, Honya et al.
U.S. Appl. No. 29/204,673, filed May 3, 2004, Ikeda et al.

(Continued)

*Primary Examiner*—Bernarr E. Gregory
(74) *Attorney, Agent, or Firm*—Oblon, Spivak, McClelland, Maier & Neustadt, P.C.

(57) ABSTRACT

A pulse wave radar device controls an amplification degree of a receiving circuit, downward at a time of measuring an object at a short distance immediately after transmission of a transmitting pulse wave and upward, at a time of measuring the object at a long distance, by increasing the amplification degree of the receiving circuit progressively with the lapse of time after the transmission of the transmitting pulse wave.

9 Claims, 7 Drawing Sheets

OTHER PUBLICATIONS

U.S. Appl. No. 10/992,724, filed Nov. 22, 2004, Ikeda.
U.S. Appl. No. 11/213,884, filed Aug. 30, 2005, Ikeda et al.
U.S. Appl. No. 11/231,968, filed Sep. 22, 2005, Yokoyama et al.
U.S. Appl. No. 11/245,125, filed Oct. 7, 2005, Honya et al.
Skolnik M. I., "Radar Handbook", pp. 5-19 to 5-23, 1970, Mc.Graw-Hill, New York, US, XP009058251.
U.S. Appl. No. 11/312,343, filed Dec. 21, 2005, Ikeda.

* cited by examiner

PULSE WAVE RADAR DEVICE

BACKGROUND OF THE INVENTION

1. Field of the Invention

This invention relates to a pulse wave radar device using the millimeter wave or submillimeter wave band, or in particular to a pulse wave radar device having an improved detection ability for the reflected wave from an object at a short distance.

2. Description of the Related Art

In recent years, a radar DEVICE has come to be mounted on an automotive vehicle for the purpose of collision prevention and auto cruising. In this in-vehicle radar DEVICE, the reciprocating distance to an object is determined by multiplying the velocity of light by the time from the transmission of the transmitting pulse wave to the receiving of the reflected wave from the object. Thus, the distance to the object is calculated by measuring the time required from the transmission of the transmitting pulse wave to the receiving of the reflected wave from the object.

This pulse wave radar device makes the preparation for receiving the receiving pulse wave reflected from the object at the shortest distance after transmitting the transmitting pulse wave. The in-vehicle pulse wave radar device is required to detect an object within a wide range of several tens of cm to several tens of m, and therefore the receiving circuit requires an amplifier circuit having a wide dynamic range from the receiving pulse wave of a large signal to the receiving pulse wave of a small signal.

In the prior art, as the receiving circuit of the pulse wave radar device requiring a wide dynamic range, an automatic gain control (AGC) circuit is used. The configuration of the conventional pulse wave radar device using the AGC circuit is shown in FIG. 1 (see Japanese Patent Application Laid-Open No. 6-174826, for example).

Figure 1:
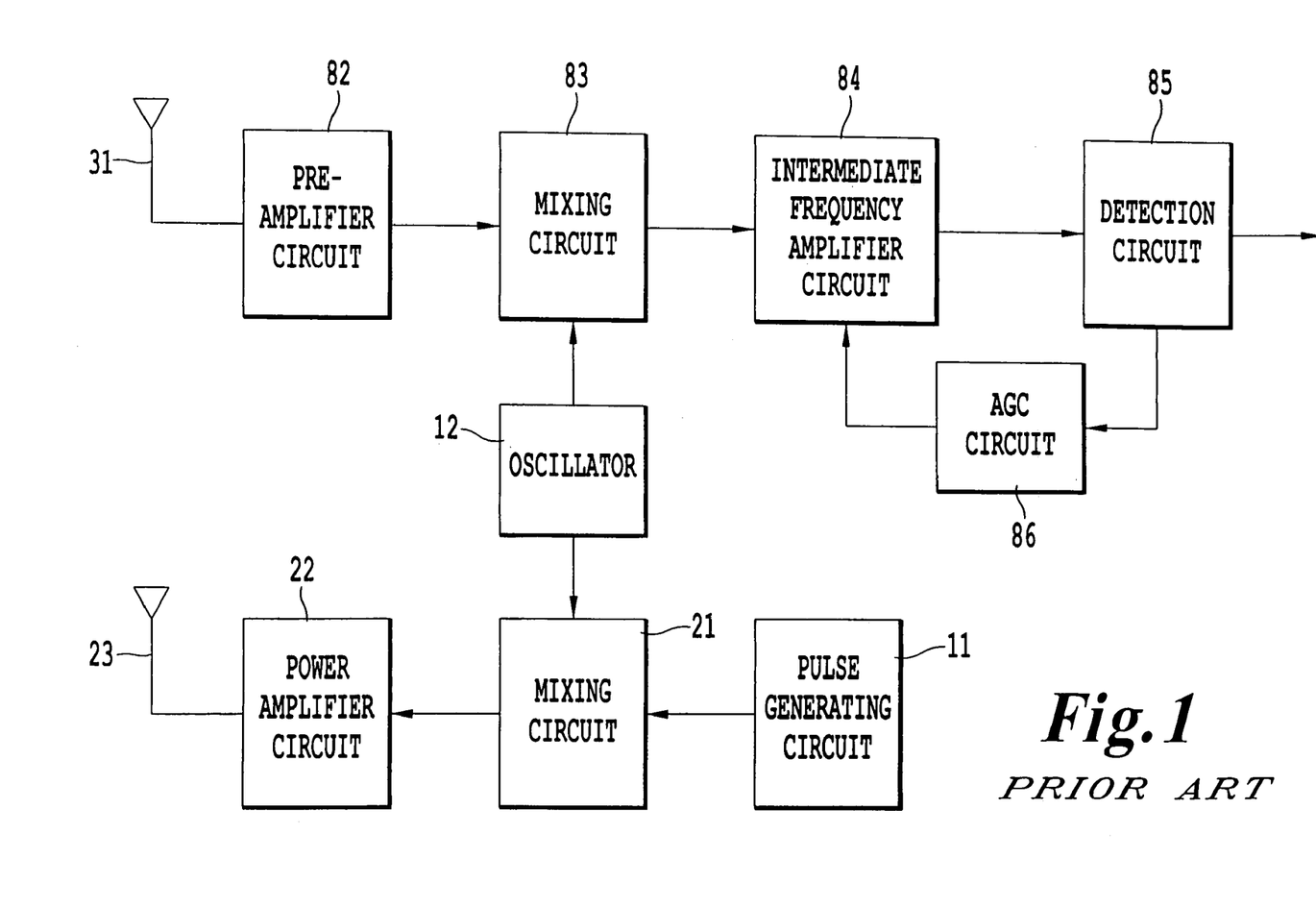
FIG. 1 is a block diagram for explaining the configuration of a pulse wave radar device using the conventional AGC circuit.

In FIG. 1, reference numeral 11 denotes a pulse generating circuit, 12 an oscillator, 21 a mixing circuit, 22 a power amplifier circuit, 23 a transmitting antenna, 31 a receiving antenna, 82 a pre-amplifier circuit, 83 a mixing circuit, 84 an intermediate frequency amplifier circuit, 85 a detection circuit, and 86 an AGC circuit. In the mixing circuit 21, the pulses from the pulse generating circuit 11 are modulated by the oscillation wave from the oscillator 12, after being amplified in the power amplifier circuit 22, emitted as a transmitting pulse wave from the transmitting antenna 23.

In the mixing circuit 83, the receiving pulse wave received by the receiving antenna 31 is demodulated by the oscillation wave from the oscillator 12, and amplified by the intermediate frequency amplifier circuit 84. During the amplification, the output of the detection circuit 85 is controlled by negative feedback through the AGC circuit 86 to produce a constant value.

Figure 2:
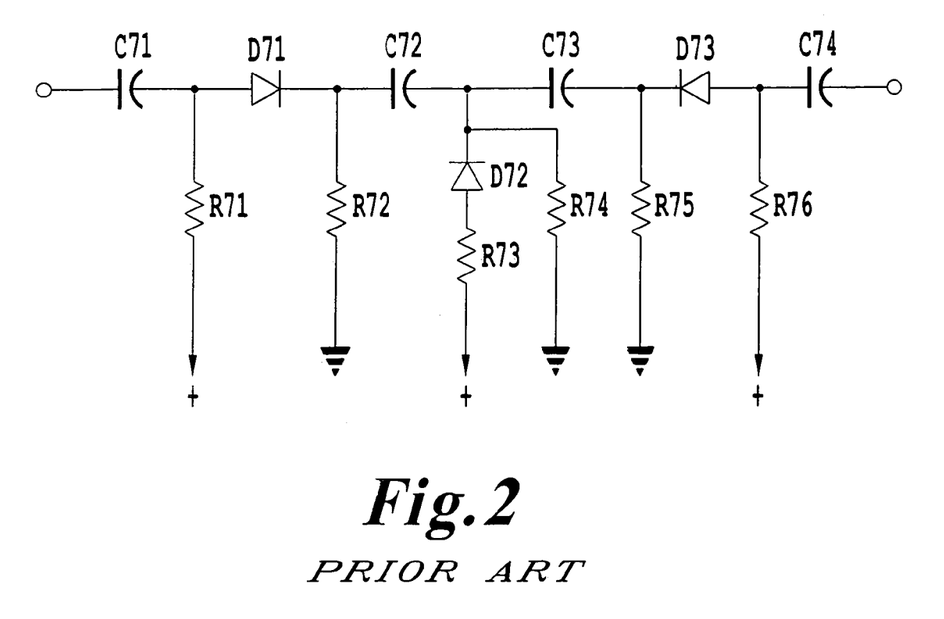
FIG. 2 is a block diagram for explaining the configuration of a variable attenuation circuit using the conventional PIN diode.

Also, the variable attenuation circuit using the PIN diode as shown in FIG. 2 is used for a variable gain amplifier circuit. In FIG. 2, reference characters R71 to R76 denote resistors, C71 to C74 denote capacitors, and D71 to D73 denote PIN diodes.

The PIN diodes D71 to D73 are DC blocked by the capacitors C71 to C74, and the resistance value of the PIN diodes D71 to D73 is variably controlled by the bias voltage from a DC power supply. Once the resistance value of the PIN diodes is variably controlled, the attenuation amount of the variable attenuation circuit is changed, and thus the amplification degree of the variable gain amplifier circuit is controlled.

SUMMARY OF THE INVENTION

In order to secure the distance resolution of 1 m or less, the pulse width of the transmitting pulse is required to be reduced to about the order of nanosecond. Once the width of the receiving pulse is reduced to the order of nanosecond, the AGC circuit described above is required to be controlled by feedback within a very short time. Thus, the AGC operation as the negative feedback control system becomes unstable and the stable circuit operation is difficult to achieve.

To cope with this problem, the object of this invention is to provide a pulse wave radar device having a high distance resolution which can measure the distance by accurately receiving the receiving pulse having a large receiving level difference between a receiving pulse wave of a large signal from a near object and a receiving pulse wave of a small signal from a remote object.

Also, in the conventional variable attenuation circuit used for the amplifier circuit, each PIN diode is required to be controlled by a separate DC power supply, and further, the existence of three current paths disadvantageously leads to a large power consumption.

To solve this problem, another object of the invention is to provide a pulse wave radar device including a receiving circuit capable of variable gain amplification and detection with a simple circuit configuration and a small in power consumption.

In order to achieve the objects described above, according to this invention, there is provided a pulse wave radar device wherein a distance to an object at a short distance is measured immediately after transmitting the transmitting pulse wave by controlling the amplification degree of the receiving circuit downward, while an object at a great distance is measured upon elapse of a predetermined time after transmitting the transmitting pulse wave with the amplification degree of the receiving circuit controlled progressively upward.

In the case where the amplification degree of the receiving circuit is controlled in this manner, a receiving pulse wave having a large signal level is reflected from the object at a short distance, and therefore can be amplified or detected at an appropriate signal level by receiving it with a small amplification degree. From an object at a large distance, on the other hand, a receiving pulse wave small in signal level is reflected, and therefore can be amplified or detected at an appropriate signal level by receiving it with a large amplification degree. Also, the receiving circuit having no feedback path for the amplification can amplify stably.

Specifically, according to this invention, there is provided a pulse wave radar device including: a transmitting circuit for periodically transmitting the transmitting pulse wave modulated from a transmitting pulse; a transmitting antenna for radiating the transmitting pulse wave from the transmitting circuit; a receiving antenna for receiving the receiving pulse wave reflected from an object; a receiving circuit for amplifying with a variably gain and detecting the receiving pulse wave from the receiving antenna; and a gain control circuit for controlling the amplification degree of the receiving circuit; wherein the gain control circuit periodically controls the amplification degree of the receiving circuit in accordance with the period in which the transmitting circuit transmits the transmitting pulse wave, and increases the amplification degree of the receiving circuit after the transmitting circuit transmits the transmitting pulse wave.

According to this invention, a pulse wave radar device is provided in which the receiving pulse waves having a large receiving level difference including the receiving pulse wave of a large signal from an object at a short distance and a receiving pulse wave of a small signal from an object at a great distance can be accurately received and the distance can be measured.

In the pulse wave radar device according to this invention, the gain control circuit can reduce the amplification degree of the receiving circuit while the transmitting circuit transmits the transmitting pulse wave.

Even in the case where an excessively large receiving pulse wave is input by the leakage of the transmitting pulse wave in the pulse wave radar device or the leakage of the transmitting pulse wave to the receiving antenna from the transmitting antenna, the receiving circuit can be protected from saturation.

In the pulse wave radar device according to this invention, the gain control circuit may reduce the amplification degree of the receiving circuit after the elapse of a predetermined time following the transmission of the transmitting pulse wave during the period when the transmitting circuit transmits the transmitting pulse wave.

After the pulse wave radar device transmits the transmitting pulse wave, after the elapse of the reciprocating propagation time corresponding to the maximum detection distance of the pulse wave radar device, the echo or the multiplex reflection of the transmitting pulse wave is received, and therefore the operation error due to the unrequired receiving pulse wave can be prevented.

In the pulse wave radar device according to the invention, the gain control circuit may control the amplification degree of the receiving circuit upward in proportion to the fourth power of the time elapsed from the transmission of the transmitting pulse wave from the transmitting circuit.

Assuming that the reflectivity of the object is constant, the intensity of the receiving pulse wave from the object is inversely proportional to the fourth power of the distance to the object. By increasing the amplification degree of the receiving circuit by the gain control circuit in proportion to the fourth power of the time elapsed from the transmission of the transmitting pulse wave, therefore, the amplification and detection at a substantially constant signal level are made possible.

The receiving circuit of the pulse wave radar device according to the invention includes a variable attenuation circuit including a first PIN diode and a second PIN diode connected in cascade between an input terminal and an output terminal with the input terminal at the N polarity, a third PIN diode connected between the junction point of the first and second PIN diodes and a common terminal with the common terminal at the P polarity, an input resistor connected between the input terminal and the common terminal and an output resistor connected between the output terminal and a control power terminal, wherein the amplification degree of the receiving circuit can be controlled by controlling the voltage applied to the control power terminal.

According to the invention, there is provided a pulse wave radar device having a receiving circuit capable of variable gain amplification and detection with a simple circuit configuration and small in power consumption.

The pulse wave radar device according to the invention may further includes a reciprocating propagation time calculation circuit for calculating the reciprocating propagation time with respect to an object based on the time difference between the timing at which the transmitting pulse wave is transmitted from the transmitting circuit and the timing at which the receiving pulse wave is received by the receiving circuit.

The provision of the reciprocating propagation time calculation circuit makes it possible to calculate the reciprocating propagation time. Once the reciprocating propagation time can be calculated, the distance to the object can be calculated based on the thus calculated reciprocating propagation time.

According to this invention, a pulse wave radar device having a high distance resolution is provided in which the receiving pulse waves having a large receiving level difference including a receiving pulse wave of a large signal from an object at a short distance and a receiving pulse wave of a small signal from an object at a great distance can be accurately received and the distance can be measured.

Also, according to the invention, there is provided a pulse wave radar device having a receiving circuit capable of variable gain amplification and detection with a simple circuit configuration and small in power consumption.

DESCRIPTION OF THE PREFERRED EMBODIMENT

Embodiments of the invention are explained below with reference to the drawings. This invention is not limited to the embodiments described below.

Figure 3:
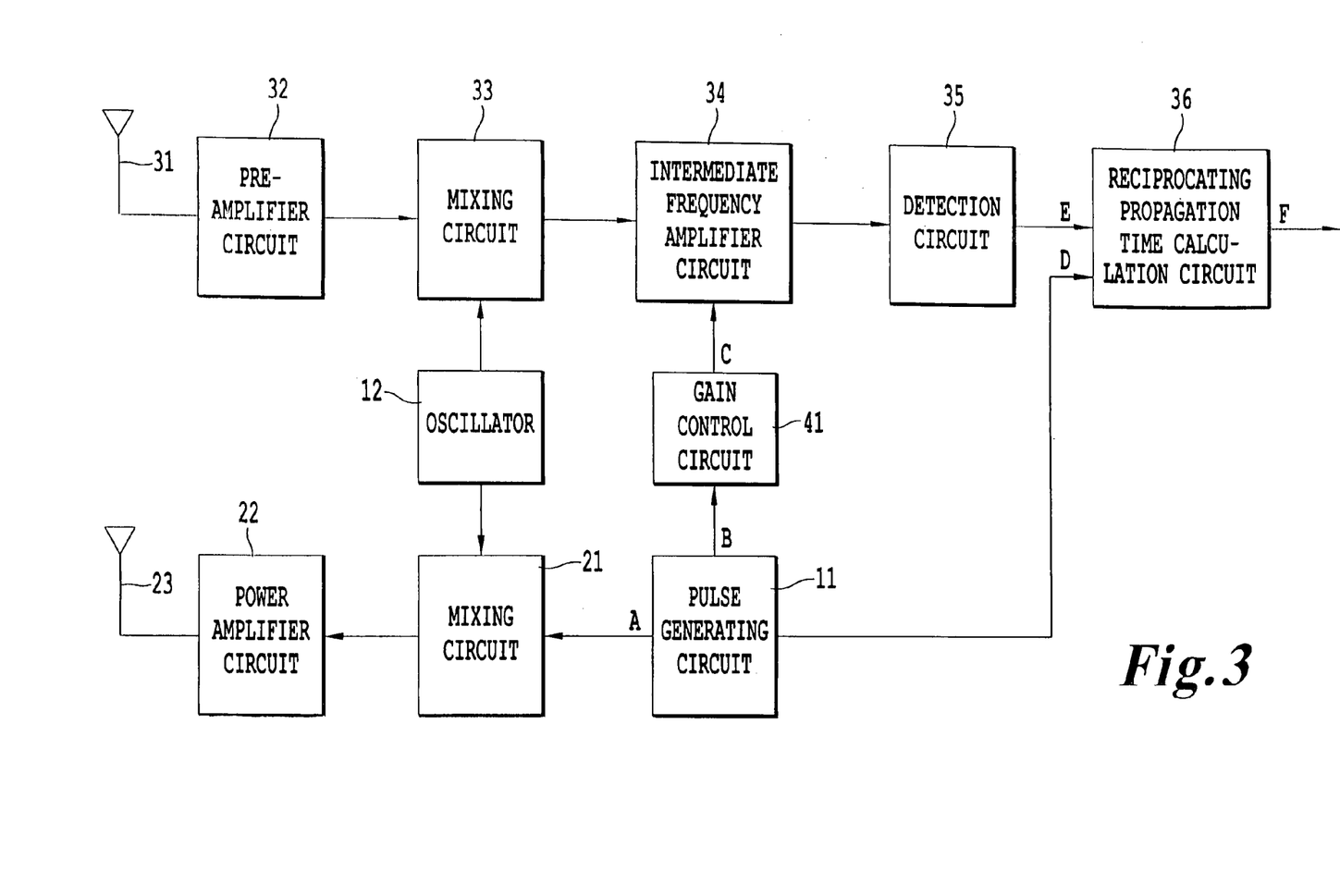
FIG. 3 is a block diagram for explaining an example of the pulse wave radar device according to an embodiment of the invention.

FIG. 3 is a block diagram for explaining an example of a pulse wave radar device according to an embodiment of the invention. The configuration of the pulse wave radar device is explained with reference to this block diagram. In FIG. 3, numeral 11 denotes a pulse generating circuit for generating transmitting pulses having a predetermined period, numeral 12 denotes an oscillator adapted to oscillate at a modulation frequency, numeral 21 denotes a mixing circuit for modulating the transmitting pulse at a modulation frequency, numeral 22 denotes a power amplifier circuit for amplifying the power of the transmitting pulse wave, numeral 23 denotes a transmitting antenna for radiating the transmitting pulse wave, numeral 31 denotes a receiving antenna for receiving the receiving pulse wave, numeral 32 denotes a pre-amplifier circuit for amplifying the receiving pulse wave, numeral 33 denotes a mixing circuit for demodulating the receiving pulse wave, numeral 34 denotes an intermediate frequency amplifier circuit for amplifying the demodulated receiving pulse, numeral 35 denotes a detection circuit for detecting the demodulated receiving pulse, numeral 36 denotes a reciprocating propagation time calculation circuit for calculating the reciprocating propagation time with respect to an object, and numeral 41 denotes a gain control circuit for periodically controlling the amplification degree of the receiving circuit.

The transmitting circuit includes the pulse generating circuit 11, the oscillator 12, the mixing circuit 21 and the power amplifier circuit 22. The receiving circuit includes the oscillator 12, the pre-amplifier circuit 32, the mixing circuit 33, the intermediate frequency amplifier circuit 34 and the detection circuit 35.

First, with reference to FIG. 3, the configuration of the transmission system of the pulse wave radar device is explained. The pulse generating circuit 11 generates transmitting pulses having a predetermined period. The predetermined period is preferably longer than the reciprocating propagation time of the radio wave corresponding to the maximum detection distance of the pulse wave radar device. The mixing circuit 21 mixes the transmitting pulse from the pulse generating circuit 11 with the modulating wave from the oscillator 12 and outputs a transmitting pulse wave. The power amplifier circuit 22 amplifies the power of the transmitting pulse wave from the mixing circuit 21, and the transmitting antenna 23 emits the transmitting pulse wave from the power amplifier circuit 22. The transmitting antenna 23 may be configured of a plurality of antennas.

Next, with reference to FIG. 3, the configuration of the receiving system of the pulse wave radar device is explained. The receiving antenna 31 receives the receiving pulse wave reflected from the object. The receiving antenna 31 may also include a plurality of antennas. The transmitting antenna may be shared with the receiving antenna. The pre-amplifier circuit 32 amplifies a small receiving pulse wave. The mixing circuit 33 demodulates the receiving pulse from the receiving pulse wave by detection with the oscillation wave in a frequency band used by the pulse wave radar device. In the intermediate frequency amplifier circuit 34, the amplification degree controlled by the gain control circuit 41 is amplified to a signal level suitable for detecting the demodulated receiving pulse from the mixing unit 33. The detection circuit 35 regenerates the receiving pulse by detecting the demodulated receiving pulse from the intermediate frequency amplifier circuit 34.

The reciprocating propagation time calculation circuit 36 calculates the reciprocating propagation time with respect to the object based on the time difference between the timing at which the transmitting pulse wave is transmitted by the transmitting circuit and the timing at which the receiving circuit receives the receiving pulse wave. In FIG. 3, the time difference is between the timing at which the pulse generating circuit 11 outputs the transmitting pulse and the timing at which the detection circuit 35 outputs the receiving pulse. The delay time in the transmitting circuit, the transmitting antenna, the receiving antenna and the receiving circuit is measured in advance. The reciprocating propagation time calculation circuit 36 preferably corrects the reciprocating propagation time with respect to the object by subtracting the delay time measured in advance.

Though not shown, the last stage of the reciprocating propagation time calculation circuit 36 includes an arithmetic circuit to calculate the distance to the object based on the reciprocating propagation time and the propagation speed.

In the pulse wave radar device shown in FIG. 3, the gain control circuit 41 periodically controls the amplification degree of the intermediate frequency amplifier circuit 34 in accordance with the period in which the pulse generating circuit 11 outputs the transmitting pulses. Specifically, the receiving pulse wave from an object at a short distance is received at a large signal within a short time after emitting of the transmitting pulse wave. The receiving pulse wave from an object at a large distance, on the other hand, is received at a small signal level after the elapse of a long time from the emitting of the transmitting pulse wave. In view of this, the gain control circuit 41 controls the amplification degree of the intermediate frequency amplifier circuit 34 to increase progressively with time after the transmitting pulse is output by the pulse generating circuit 11.

This control operation makes it possible for the intermediate frequency amplifier circuit 34 to output the receiving pulse of a substantially constant signal level for both the receiving pulse waves from the objects at both short and long distances. Thus, even the detection circuit 35 having a small dynamic range can operate accurately. Also, the pulse wave radar device according to the invention, which is not controlled by feedback, can operate in stable fashion with a high distance resolution.

Figure 4:
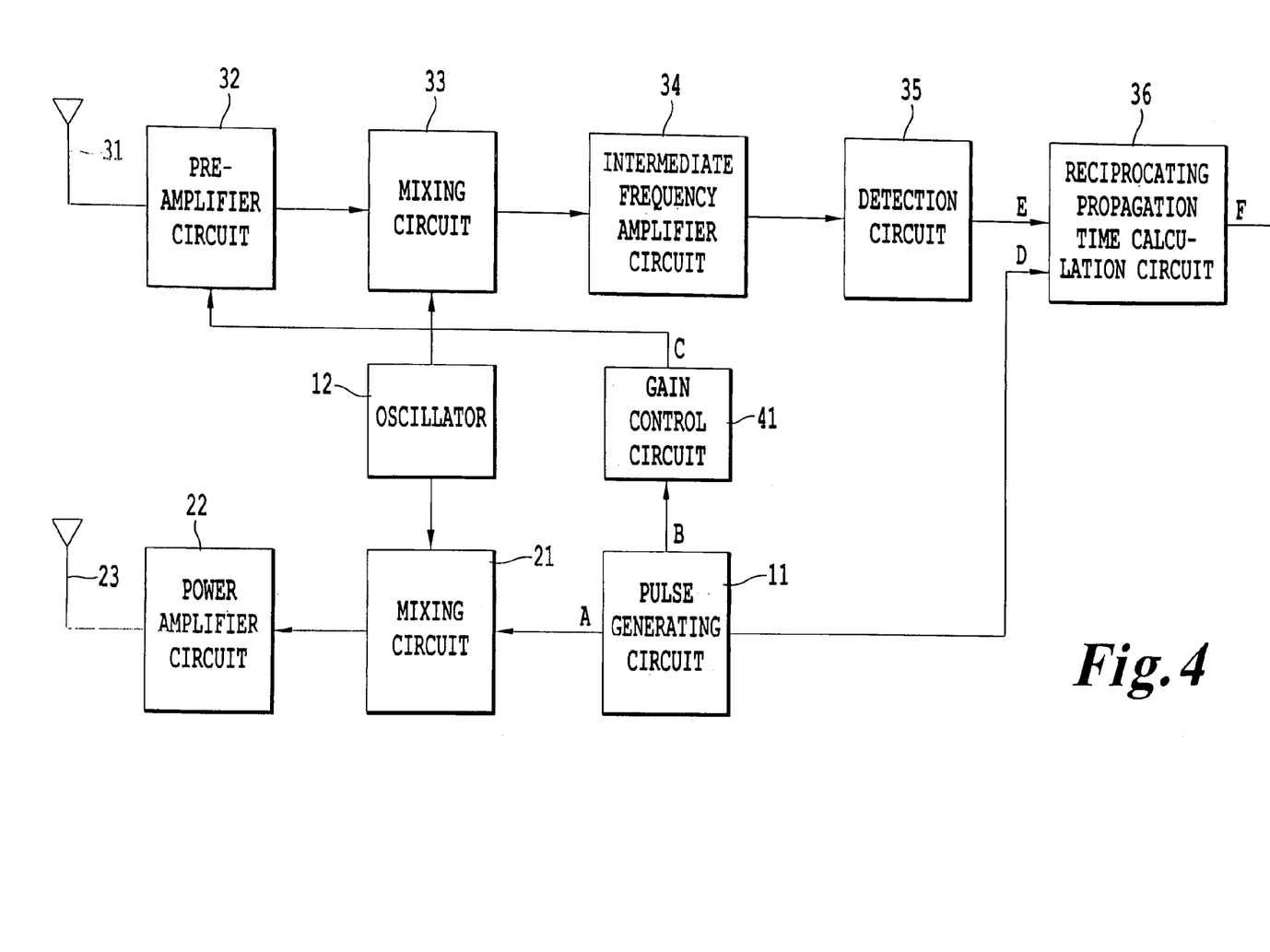
FIG. 4 is a block diagram for explaining an example of the pulse wave radar device according to another embodiment of the invention.

Another example of the pulse wave radar device is shown in FIG. 4. In FIG. 4, the same reference numerals as those in FIG. 3 denote the same component elements. The pulse wave radar device shown in FIG. 4 is different from the pulse wave radar device shown in FIG. 3 in that in the former, the amplification degree of the pre-amplifier circuit 32 is periodically controlled by the gain control circuit 41 in accordance with the period in which the transmitting pulse is output from the pulse generating circuit 11. The gain control circuit 41 controls the amplification degree of the pre-amplifier circuit 32 to increase after the transmitting pulse is output from the pulse generating circuit 11.

This control operation makes it possible for the pre-amplifier circuit 32 to output the receiving pulses of a substantially constant signal level for both the receiving pulse waves from the objects at both short and long distances. Thus, even the mixing circuit 33, the intermediate frequency amplifier circuit 34 and the detection circuit 35 having a small dynamic range can operate normally. Thus, this pulse wave radar device is more advantageous than the pulse wave radar device described in FIG. 3 in that in the former, the magnitude of the dynamic range of the mixing circuit 33 and the intermediate frequency amplifier circuit 34 can be relaxed. Also, for lack of feedback control, the pulse wave radar device according to this embodiment can operate in stable fashion with a high distance resolution.

Figure 5:
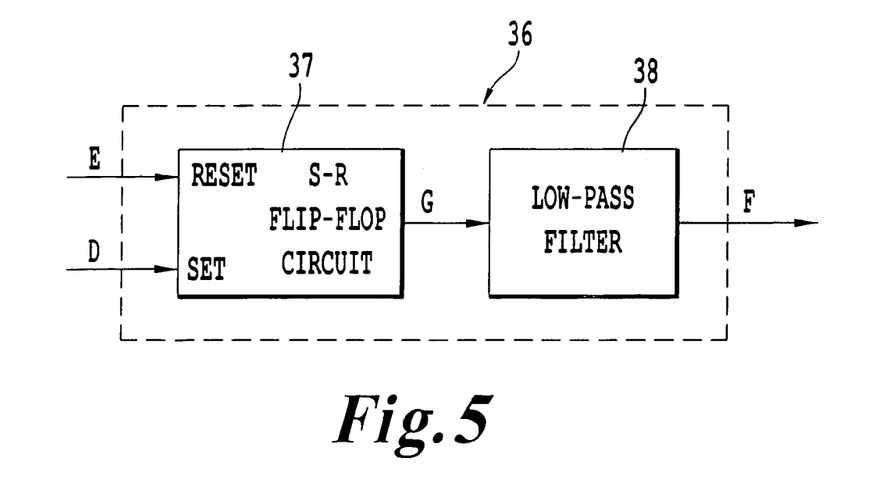
FIG. 5 is a diagram for explaining an example of configuration of the reciprocating propagation time calculation circuit.

The reciprocating propagation time calculation circuit shown in FIG. 3 or 4 is so configured that a S-R flip-flop circuit, in which the timing at which the transmitting pulse is output from the pulse generating circuit 11 provides a set input and the timing at which the detection circuit 35 outputs the receiving pulse provides a reset input, is combined with a low-pass filter for extracting the low-frequency component of the output of the S-R flip-flop circuit. FIG. 5 shows an example of the configuration of the reciprocating propagation time calculation circuit. In FIG. 5, numeral 36 denotes the reciprocating propagation time calculation circuit, numeral 37 denotes the S-R flip-flop circuit, and numeral 38 denotes the low-pass In FIG. 5, the S-R flip-flop circuit 37 is such that the timing at which the transmitting pulse is output from the pulse generating circuit provides a set input (Set in FIG. 5), and the timing at which the detection circuit outputs the receiving pulse provides a reset input (Reset in FIG. 5). The S-R flip-flop circuit 37 outputs a signal in such a manner that the on time is long in the case where the period from the timing at which the pulse generating circuit outputs the transmitting pulse to the timing at which the detection circuit outputs the receiving pulse is long, and the on time is short in the case where the period is short from the timing at which the pulse generating circuit outputs the transmitting pulse to the timing at which the detection circuit outputs the receiving pulse.

The low-pass filter 38 extracts the low-frequency component from the output of the S-R flip-flop circuit 37. Specifically, in the case where the period from the timing at which the pulse generating circuit outputs the transmitting pulse to the timing at which the detection circuit outputs the receiving pulse is long, the output of the low-pass filter 38 has a large low-frequency component, while in the case where the period from the timing at which the pulse generating circuit outputs the transmitting pulse to the timing at which the detection circuit outputs the receiving pulse is short, the output of the low-pass filter 38 has a small low-frequency component. By detecting the output of the low-pass filter 38, therefore, the reciprocating propagation time with respect to the object can be calculated. The distance to the object can be digitally indicated by converting the output of the low-pass filter 38 into a digital signal.

In calculating the distance to the object, the delay time in the transmitting circuit or the receiving circuit of the pulse wave radar device is corrected by shifting the bias of the output level of the reciprocating propagation time calculation circuit by an amount corresponding to the delay time, or the delay time is corrected when calculating the distance to the object based on the output of the reciprocating propagation time calculation circuit.

The reciprocating propagation time calculation circuit may alternatively be a pulse count circuit operated in such a manner that the timing at which the pulse generating circuit outputs the transmitting pulse provides a set input, while the timing at which the detection circuit outputs the receiving pulse provides a reset input. During the time from the set input to the reset input, pulses of a predetermined period are generated, and the pulse count circuit counts the number of the pulses during the particular time, thereby making it possible to calculate the reciprocating propagation time with respect to the object.

Both of the reciprocating propagation time calculation circuits described above can calculate the distance to the object by dividing the reciprocating propagation time by twice the speed of light.

Figure 6A:
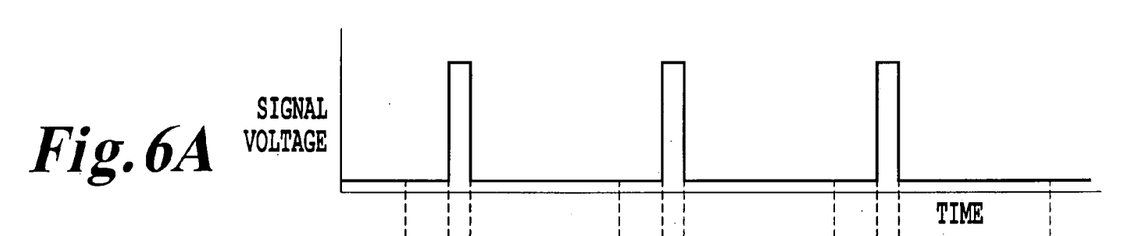
FIGS. 6A–6F are diagrams for explaining the operation of a pulse wave radar device according to the invention.
Figure 6B:
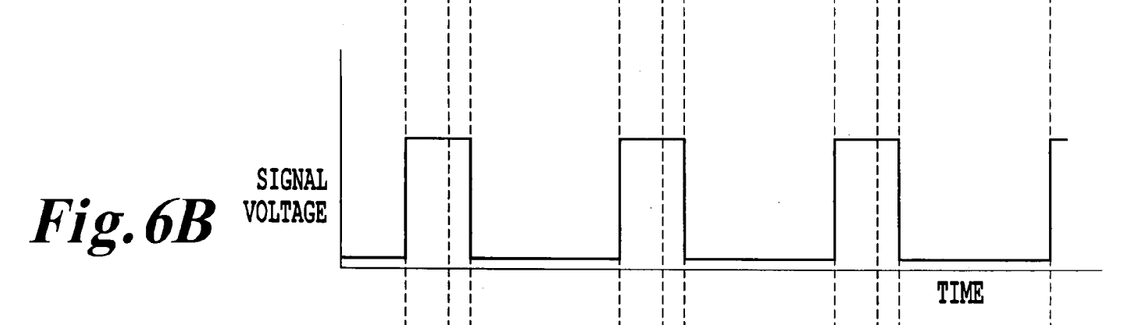
Figure 6C:
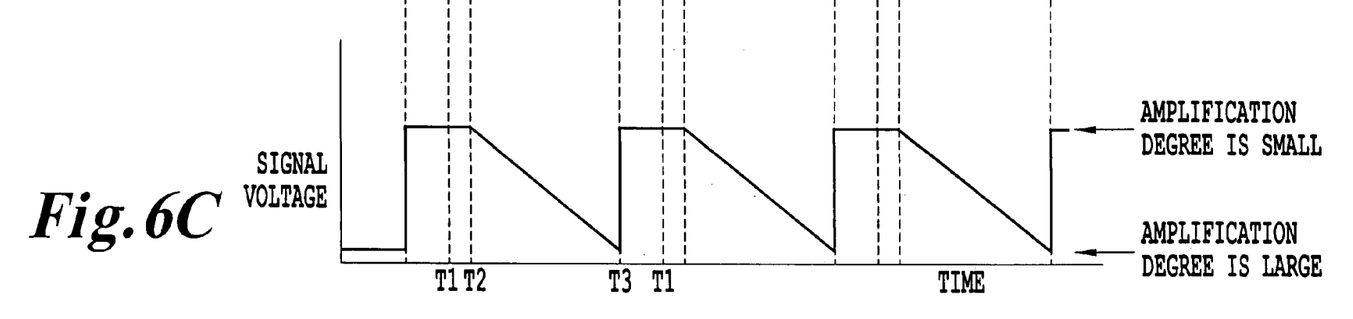
Figure 6D:
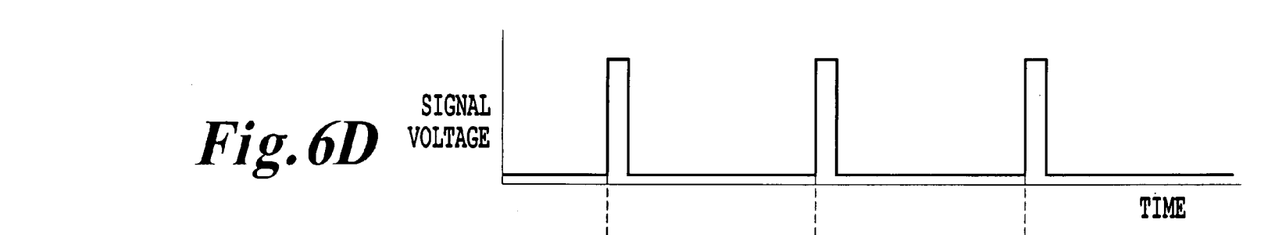
Figure 6E:
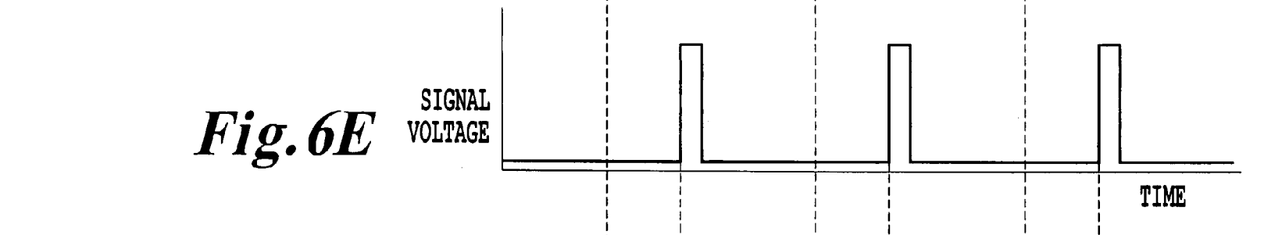
Figure 6F:
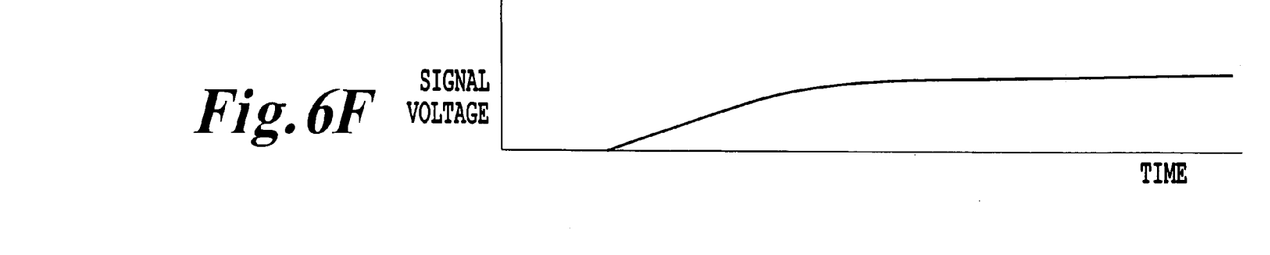
Figure 6G:
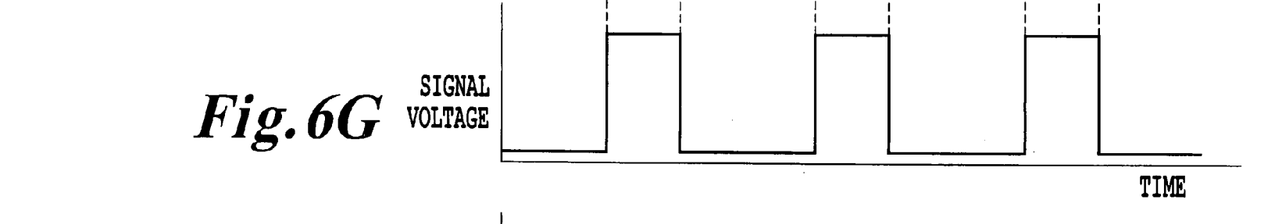
Figure 7:
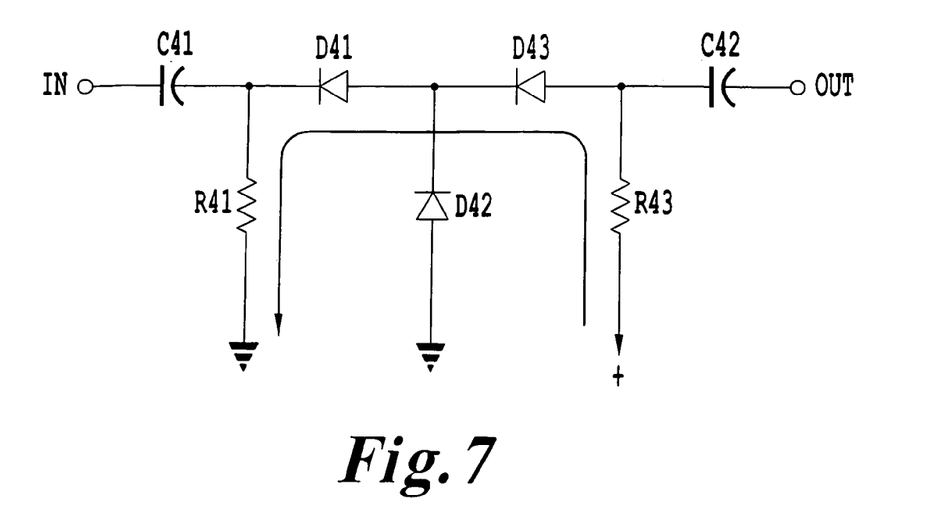
FIG. 7 is a diagram for explaining the operation of the variable attenuation circuit used in the receiving circuit of the pulse wave radar device according to the invention.

With reference to FIGS. 6, 7, the operation of the pulse wave radar device is explained. In FIGS. 6, 7, FIGS. 6A, 6B, 6C, 7D, 7E, 7G, 7F show the signal waveforms at the points A, B, C, D, E, G, F, respectively, shown in FIGS. 3, 4, 5. An explanation is given below by appropriately referring to the reference characters shown in FIGS. 3, 4, and 5.

FIG. 6A shows the transmitting pulses output toward the mixing circuit 21 by the pulse generating circuit 11. The period of the transmitting pulses is set longer than the reciprocating propagation time corresponding to the maximum detection distance of the pulse wave radar device. The transmitting pulse width is preferably shorter than the time corresponding to the distance resolution of the object.

FIG. 6B shows the signal output by the pulse generating circuit 11 toward the gain control circuit 41. The amplification degree of the receiving circuit is preferably reduced for a predetermined length of time before transmission of the transmitting pulse wave so that the gain control circuit 41 reduces the amplification degree of the receiving circuit upon the elapse of the reciprocating propagation time corresponding to the maximum detection distance of the pulse wave radar device after transmitting the transmitting pulse wave during the period of transmission of the transmitting pulse wave. The amplification degree during this predetermined length of time is preferably minimum. The operation error can be prevented by reducing the sensitivity against the unnecessary receiving pulses caused by following a detour or by multiple reflection after receiving the receiving pulse wave from the object at the maximum detection distance.

Also, during the period when the pulse generating circuit 11 outputs the transmitting pulses, the gain control circuit 41 preferably reduces the amplification degree of the receiving circuit. During this period, the amplification degree is preferably minimized. The saturation of the receiving circuit can be prevented which otherwise might be caused by the leakage of the transmitting pulse wave into the pulse wave radar device or the leakage from the transmitting antenna 23 to the receiving antenna 31. Once the receiving circuit is saturated, the receiving pulse wave from the object could not be normally received until the saturation is restored.

FIG. 6C shows the signal with which the gain control circuit 41 controls the amplification degree of the receiving circuit The amplification degree of the intermediate frequency amplifier circuit 34 or the pre-amplifier circuit 32 is controlled as shown in FIG. 6C. Specifically, the amplification degree of the intermediate frequency amplifier circuit 34 or the pre-amplifier circuit 32 is controlled upward gradually with time after transmission of the transmitting pulse wave. A long distance to the object lengthens the reciprocating propagation time of the radio wave, and the signal level of the receiving pulse wave is reduced along with distance. By gradually increasing the amplification degree, therefore, the signal level variation of the receiving pulse wave can be reduced after amplification. As a result, the dynamic range of the receiving circuit can be reduced.

Also, the gain control circuit 41 preferably controls the amplification degree of the receiving circuit to increase in proportion to the fourth power of the time elapsed after transmission of the transmitting pulse wave. The signal level of the transmitting pulse wave emitted from the transmitting antenna 23 decreases in inverse proportion to the square of the propagation distance. Similarly, the signal level of the receiving pulse wave from the object decreases in inverse proportion to the square of the propagation distance. This indicates that the signal level variation in the receiving circuit can be substantially minimized by controlling the amplification degree of the receiving circuit to increase in proportion to the fourth power of the time elapsed from the transmission of the transmitting pulse wave.

In FIG. 6, the pulse generating circuit outputs the signal shown in FIG. 6B. However as an alternative, the signal as shown in FIG. 6A may be output by the pulse generating circuit 6A so that the gain control circuit 41 may output the signal as shown in FIG. 6C.

FIG. 6D shows a pulse waveform output by the pulse generating circuit 11 toward the reciprocating propagation time calculation circuit in timing with the output of the transmitting pulse. The timing of the pulses shown in FIG. 6D may coincide with that of the pulses shown in FIG. 6A, or taking the delay in the transmitting circuit or the receiving circuit of the pulse wave radar device into consideration, may be delayed behind the timing of the pulses shown in FIG. 6A. In the case where the timing of the pulses shown in FIG. 6D is rendered to coincide with the timing of the pulses shown in FIG. 6A, the delay is corrected in the reciprocating propagation time calculation circuit or the last stage thereof.

FIG. 6E shows the receiving pulses from the detection circuit 35. The time difference in timing between the pulse waveform shown in FIG. 6D and the pulse waveform shown in FIG. 6E corresponds to the reciprocating propagation time of the radar wave. From this reciprocating propagation time, the distance to the object can be calculated.

FIGS. 6G, 6F show the operation waveforms in the reciprocating propagation time calculation circuit 36 including a combination of the S-R flip-flop circuit 37 and the low-pass filter 38 shown in FIG. 5. The time length from the timing at which the pulse (FIG. 6D) is input from the pulse generating circuit 11 to the timing at which the receiving pulse (FIG. 6E) is input from the detection circuit 35 corresponds to the pulse width of the pulse signal (FIG. 6G) output from the S-R flip-flop circuit 37. The pulse width of the pulse signal (FIG. 6G) is narrow when the distance to the object is short and wide when the distance to the object is long.

The pulse signal (FIG. 6G) output from the S-R flip-flop circuit 37 is such that the signal voltage is constant and only the pulse width changes with the reciprocating propagation time with respect to the object. The low-pass filter 38, as shown in FIG. 6F, extracts the DC component of the pulse signals having a constant voltage and different pulse widths output from the S-R flip-flop circuit 37. Specifically, the pulse signal is converted into the DC signal (FIG. 6F) having a signal level corresponding to the pulse width of the pulse signal (FIG. 6G) output from the S-R flip-flop circuit 37. The signal voltage of this DC signal assumes a signal level corresponding to the reciprocating propagation time with respect to the object.

As described above, even a receiving circuit having a small dynamic range can accurately receive the receiving pulse waves having a large difference in receiving level, including the receiving pulse wave of a large signal level from an object at a short distance and the receiving pulse wave of a small signal level from an object at a long distance, and therefore a pulse wave radar device can be provided which can measure the distance over a wide range of distance from short to long distances.

Next, the amplifier circuit for controlling the amplification degree is explained. The amplification degree can be controlled either by changing the amplification degree of the amplifier circuit directly or by controlling the attenuation amount of the variable attenuation circuit with a variable attenuation circuit included in the amplifier circuit and thereby changing the amplification degree of the amplifier circuit as a whole. This embodiment is explained with reference to the variable attenuation circuit used in the latter configuration.

Figure 8:
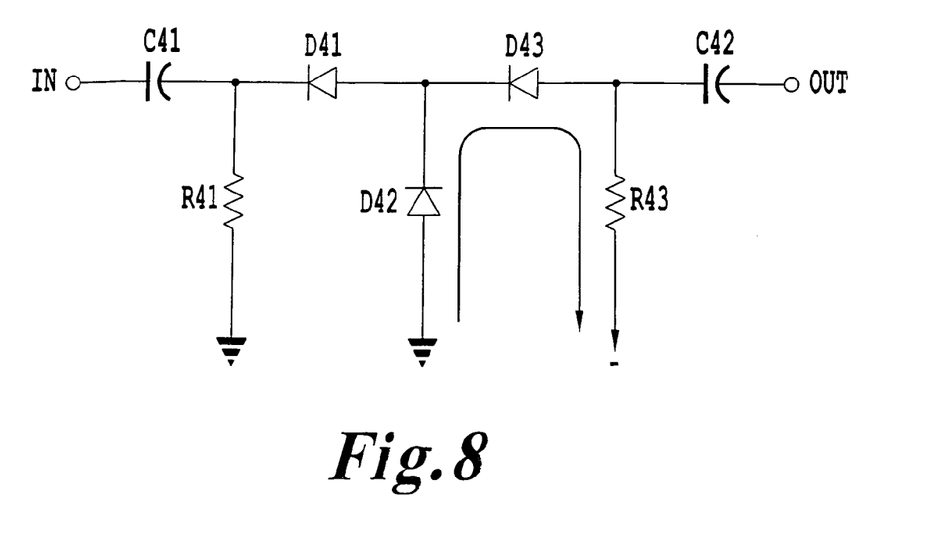
FIG. 8 is a diagram for explaining the operation of the variable attenuation circuit used in the receiving circuit of the pulse wave radar device according to the invention.

FIGS. 7, 8 are connection diagrams showing a configuration of the variable attenuation circuit. In FIGS. 7, 8, reference numerals C41, C42 denote capacitors for DC blocking electrically between the variable attenuation circuit and external circuits. Reference numeral R41 denotes a resistor for input impedance matching. Numeral R43 denotes a load resistor. Numerals D41, D42, D43 denote PIN diodes for adjusting the attenuation amount.

In FIGS. 7, 8, PIN diodes D41, D43 are connected in cascade between an input terminal (In) and an output terminal (Out) with the input terminal (In) of N polarity, and a PIN diode D42 is connected between the junction point of the PIN diodes D41, D43 and a common terminal (ground) with the common terminal at P polarity. The resistor R41 is connected between the input terminal (In) and the common terminal, and the resistor R43 between the output terminal and the control power terminal.

In FIG. 7, a voltage positive with respect to the common terminal is applied to the control power terminal connected with an end of the resistor R43. The current flows from the resistor R43 through the PIN diodes D43, D41 to the resistor R41. By increasing the applied voltage and thus increasing the current flowing through the PIN diodes D43, D41, the impedance of the PIN diodes D41, D43 is decreased. The most part of the signal input to the input terminal (In) is loaded on the resistor R43 and the signal level at the output terminal (Out) is not attenuated. Therefore, the attenuation amount of the variable attenuation circuit is decreased.

By decreasing the applied voltage, on the other hand, the current flowing through the PIN diodes D43, D41 is decreased, while the impedance of the PIN diodes D41, D43 increases. The signal input from the input terminal (In) is mainly loaded on the PIN diodes D41, D43, and the signal level of the output terminal (Out) is attenuated, and therefore the attenuation amount of the variable attenuation circuit increases.

In FIG. 8, the impedance of the PIN diode D43 is further increased by applying the voltage negative with respect to the common terminal to the control power terminal connected with an end of the resistor R43. At the same time, a slight current flows through the PIN diodes D42, D43 and the resistor 43. The impedance of the PIN diode D42 is decreased, while the impedance of the PIN diode D43 is increased. Thus, the most part of the signal input from the input terminal (In) is loaded on the PIN diodes D41, D43, and the signal level at the output terminal (Out) is further attenuated. Therefore, the attenuation amount of the variable attenuation circuit further increases.

This configuration can make up a variable attenuation circuit in which the attenuation amount with a large variation can be achieved while securing the input impedance matching at the resistor R41. Further, it is possible to reduce power consumption because there is only one current path. Further, for lack of a reactance element having a frequency characteristic as a component element, a wide operation range is secured.

The receiving circuit having the above-mentioned variable attenuation circuit can control the voltage applied to the control power terminal and thereby control the amplification degree of the receiving circuit.

The output impedance matching can be assured by rendering the impedance of the resistor R43 coincide with the output resistance. Also, to secure the output impedance matching alone, the input terminal (In) is connected to the output, while the output terminal (Out) is connected to the input.

As explained above, a pulse wave radar device having a high distance resolution can be provided, in which the receiving pulses having a large receiving level difference including the receiving pulse wave of a large signal level from an object at a short distance and the receiving pulse wave of a small signal level from an object at a long distance can be accurately received to measure the distance.

Also, a pulse wave radar device can be provided having a receiving circuit capable of variable gain amplification and detection with a simple circuit configuration and small in power consumption.

The pulse wave radar device according to the invention can find an application as an in-vehicle device aimed at the prevention of vehicle collision or auto cruise, and as a stationary pulse wave radar device as well.

What is claimed is:

1. A pulse wave radar device comprising:
a transmitting circuit configured to transmit a transmitting pulse wave modulated from a transmitting pulse;
a transmitting antenna configured to radiate the transmitting pulse wave from the transmitting circuit;
a receiving antenna configured to receive a receiving pulse wave reflected from an object;
a receiving circuit configured to (i) variably gain amplify, and (ii) detect the receiving pulse wave received from the receiving antenna; and
a gain control circuit configured to control an amplification degree of the receiving circuit;
wherein the gain control circuit periodically controls the amplification degree of the receiving circuit in accordance with the period in which the transmitting circuit transmits the transmitting pulse wave, such that increases the amplification degree of the receiving circuit upward after the transmitting circuit transmits the transmitting pulse wave, and reduces the amplification degree of the receiving circuit downward for a predetermined length of time before the transmitting circuit transmits the transmitting pulse wave.

2. A pulse wave radar device according to claim 1, wherein the gain control circuit reduces the amplification degree of the receiving circuit while the transmitting circuit transmits the transmitting pulse wave.

3. A pulse wave radar device according to claims 1 or 2, wherein the gain control circuit controls the amplification degree of the receiving circuit upward in proportion to the fourth power of the time elapsed after the transmitting pulse wave is transmitted from the transmitting circuit.

4. A pulse wave radar device according to claims 3, wherein the receiving circuit has a variable attenuation circuit including
a first PIN diode and a second PIN diode connected in cascade between an input terminal and an output terminal with the input terminal side at the N polarity,
a third PIN diode connected between the junction point of the first PIN diode and the second PIN diode and a common terminal with the common terminal side at the P polarity;
an input resistor connected between the input terminal and the common terminal; and
an output resistor connected between the output terminal and a control power terminal,
wherein the amplification degree of the receiving circuit is controlled by controlling the voltage applied to the control power terminal.

5. A pulse wave radar device according to claims 4, further comprising a reciprocating propagation time calculation circuit for calculating the reciprocating propagation time with respect to the object based on the time difference between the timing at which the transmitting pulse wave is transmitted from the transmitting circuit and the timing at which the receiving circuit receives the receiving pulse wave.

6. A pulse wave radar device according to claims 3, further comprising a reciprocating propagation time calculation circuit for calculating the reciprocating propagation time with respect to the object based on the time difference between the timing at which the transmitting pulse wave is transmitted from the transmitting circuit and the timing at which the receiving circuit receives the receiving pulse wave.

7. A pulse wave radar device according to claims 1 or 2, wherein the receiving circuit has a variable attenuation circuit including
a first PIN diode and a second PIN diode connected in cascade between an input terminal and an output terminal with the input terminal side at the N polarity,
a third PIN diode connected between the junction point of the first PIN diode and the second PIN diode and a common terminal with the common terminal side at the P polarity;
an input resistor connected between the input terminal and the common terminal; and
an output resistor connected between the output terminal and a control power terminal,
wherein the amplification degree of the receiving circuit is controlled by controlling the voltage applied to the control power terminal.

8. A pulse wave radar device according to claims 7, further comprising a reciprocating propagation time calculation circuit for calculating the reciprocating propagation time with respect to the object based on the time difference between the timing at which the transmitting pulse wave is transmitted from the transmitting circuit and the timing at which the receiving circuit receives the receiving pulse wave.

9. A pulse wave radar device according to claims 1 or 2, further comprising a reciprocating propagation time calculation circuit for calculating the reciprocating propagation time with respect to the object based on the time difference between the timing at which the transmitting pulse wave is transmitted from the transmitting circuit and the timing at which the receiving circuit receives the receiving pulse wave.

* * * * *